UNITED STATES PATENT OFFICE.

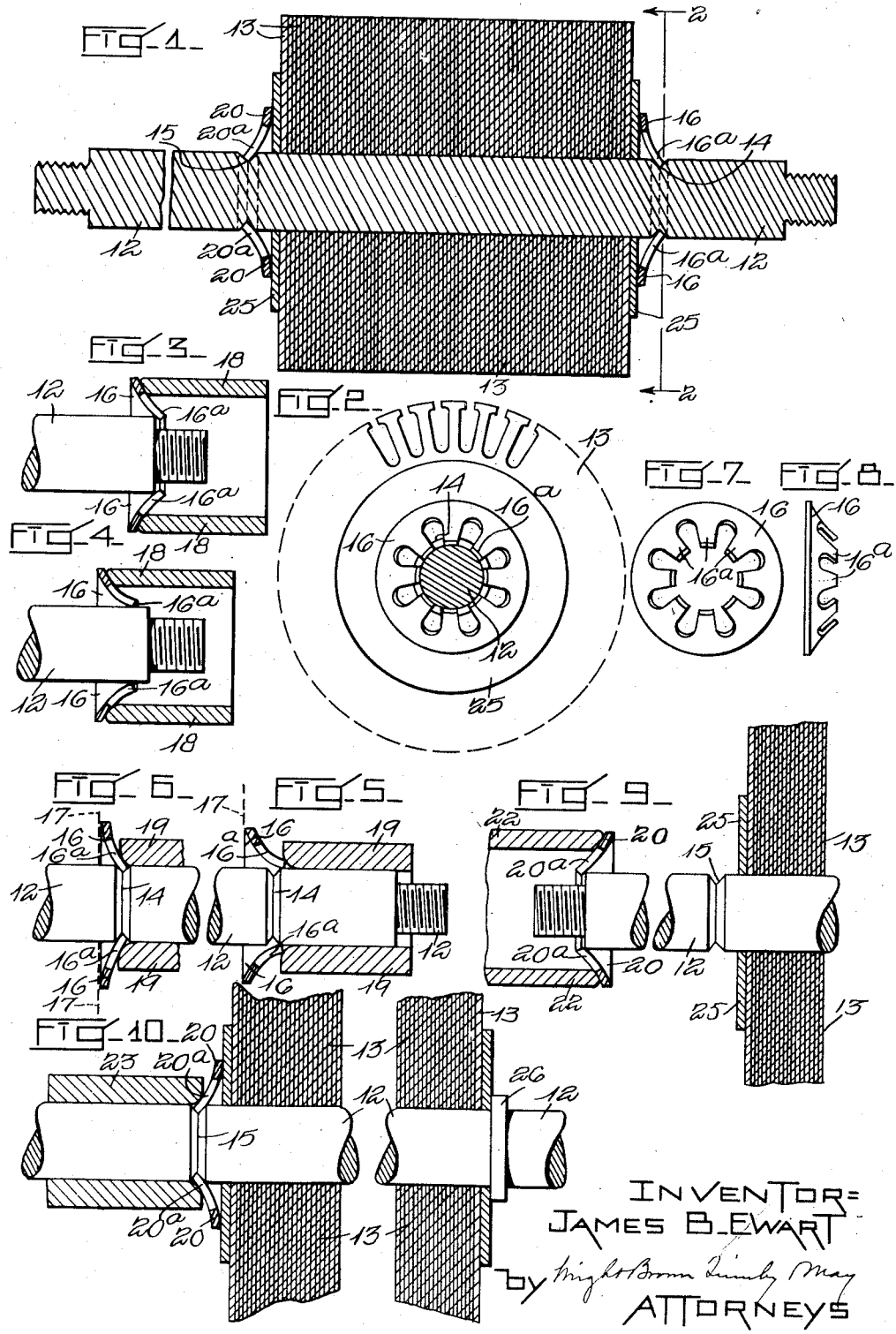

JAMES B. EWART, OF NORTH ANDOVER, MASSACHUSETTS, ASSIGNOR TO STEEL SPECIALTIES COMPANY, OF WALTHAM, MASSACHUSETTS, A CORPORATION OF MASSACHUSETTS.

SHAFT OR SPINDLE AND MEANS FOR SECURING BODY-CONFINING ABUTMENTS THERETO.

1,192,404.  Specification of Letters Patent.  Patented July 25, 1916.

Application filed February 8, 1916. Serial No. 76,949.

*To all whom it may concern:*

Be it known that I, JAMES B. EWART, a citizen of the United States, residing at North Andover, in the county of Essex and State of Massachusetts, have invented new and useful Improvements in Shafts or Spindles and Means for Securing Body-Confining Abutments Thereto, of which the following is a specification.

This invention relates to a shaft or spindle carrying a member such as a magneto armature, said member being apertured to receive the shaft, and the shaft being provided with means for confining the member thereon to cause the shaft and member to rotate in unison.

The invention has for its object to provide an improved and economical construction of the shaft and the member confining means engaged therewith, permitting the quick and convenient assemblage of the parts, and insuring a rigid and durable connection between the shaft and member.

The invention is embodied in the improvements which I will now proceed to describe and claim.

Of the accompanying drawings forming a part of this specification: Figure 1 represents a longitudinal section of a shaft and a member formed as a laminated armature body secured thereto by means embodying my invention; Fig. 2 represents a section on line 2—2 of Fig. 1, and an end elevation of the member; Figs. 3, 4, 5 and 6 represent fragmentary views illustrating the operation of securing the part called the inner abutment to the shaft. Figs. 7 and 8 represent respectively a side and an edge view of the inner abutment; Fig. 9 represents a fragmentary view partially illustrating the operation of securing the part called the outer abutment to the shaft; Fig. 10 represents a fragmentary view similar in a general way to Fig. 1, and showing another form of inner abutment.

The same reference characters indicate the same or similar parts in all the views.

Referring first to Figs. 1 to 9 inclusive, 12 represents a shaft or spindle, the end portions of which may constitute journals adapted to rotate in suitable bearings, and 13 represents a member secured to said shaft in accordance with my invention, the member as here shown being centrally apertured to receive the shaft and comprising a multiplicity of thin metal plates or laminæ radially slotted at their peripheries as indicated by Fig. 2, the construction of the member being that ordinarily employed in rotary armatures. While I have selected this type of member for purposes of illustration, I do not limit myself thereto, although my invention is particularly intended and adapted for use with rotary armatures. The shaft is provided with two spaced-apart peripheral grooves 14 and 15 hereinafter referred to for convenience as the inner and the outer groove.

16 represents an inner abutment engaged with the inner groove 14, and formed as an annulus struck up or pressed from resilient sheet or thin plate metal, such as low grade steel. Said annulus includes a continuous inexpansible marginal portion or annular body, having an inner annular face formed to bear on the member 13, and on outer annular face forming an abutment for a driving tool, and radial fingers 16ᵃ which project inwardly from the annular body and are preferably inclined relatively to the plane of the margin of said body, as shown by Fig. 8. The inner ends of said fingers collectively form the sectional margin of a hole preferably of smaller diameter than the shaft 12, so that when the annulus is in the position shown by Fig. 3 the inner ends of the fingers overlap the end of the shaft.

The annulus is first forced upon the shaft by a tubular driving tool 18, applied to the outer face of the annular body, as shown by Fig. 4, the fingers being thus deflected laterally by the periphery of the shaft and put under tension. Next, the annulus is further forced upon the shaft by a tubular driving tool 19 of smaller diameter than the tool 18, as shown by Fig. 5, until the fingers register with the inner groove 14, whereupon the fingers are forced into the groove, as shown by Fig. 6, partly by their own resilience and partly by the tool 19, the pressure of the tool against the fingers being sufficient to bend them into the groove. I do not limit myself to the described formation of the fingers causing them to be deflected and put under tension by the shaft, and may rely wholly on the pressure of the tool 19 to engage the fingers with the groove. A temporary supporting body 17, indicated by dotted lines in Figs. 5 and 6, may be employed to support the annulus 16 while its fingers are being engaged with the groove. The engaged fingers exert a strong centripetal grip, firmly locking the inner abutment or annulus 16 to the shaft. The inclination of the fingers 16ª causes them to act as struts coöperating with one side of the groove in resisting movement of the annulus toward the end of the shaft to which it was originally applied. It will be seen that the shaft is now provided with a rigid inner abutment applied before the application of the member 13 to the shaft. The length of the member is such that when applied to the shaft with its inner end bearing on the inner annular face of the inner abutment, its outer end is in position to coöperate with the outer abutment 20 next described. Said outer abutment is also an annulus which may be identical in form and construction with the annulus 16, its fingers 20ª forming the sectional margin of a hole which may be of slightly smaller diameter than that of the shaft, so that when the annulus 20 is placed on the shaft with its fingers inclined away from the outer end of the member 13, as shown by Fig. 9, and is forced inwardly, there may be a slight deflection of the fingers 20ª by the periphery of the shaft. The body of each annulus is shown as of frusto-conical form, its inclination being less steep than that of the fingers.

A tubular driving tool 22 is next applied to the annular outer face of the body of the annulus 20, and caused to force the same along the shaft toward the member 13, until the inner face of said body comes in contact with the member 13, after which a tubular driving tool 23 of smaller diameter may be employed to force the fingers 20ª into the outer groove 15 and cause their ends to exert a strong centripetal grip on the shaft, the fingers being so inclined that they act as struts engaging one side of the groove and preventing separation of the outer abutment from the member.

The described construction permits the quick and convenient assemblage of the parts by first applying the inner abutment, then the member 13, and finally the outer abutment, each operation being quickly performed. The shaft requires no adaptation other than the formation of the grooves therein, and the abutments are of simple and economical construction.

I prefer to apply relatively thick metallic washers 15 to the ends of the member 13, these being, for the purposes of my invention, parts of the member.

If desired, the shaft may be provided with an inner abutment 26, which is an integral enlargement of the shaft, as shown by Fig. 10.

Having described my invention, I claim:

1. In combination, a shaft having a fixed annular inner abutment and a peripheral groove spaced from said abutment, a member mounted on the shaft and confined at its inner end by said inner abutment, and an outer abutment formed as an annulus composed of an inexpansible annular body having an inner annular face bearing on said member, an outer annular face forming an abutment for a driving tool, and a plurality of fingers projecting inwardly from said body and inclined relatively to the plane of the margin of the body, said fingers being forced into said groove to hold the outer abutment against the outer end of said member, the member and outer abutment being successively applied to the shaft.

2. In combination, a shaft having an inner and an outer peripheral groove, a member mounted on the shaft between said grooves, an inner abutment formed as an annulus composed of an inexpansible annular body having an inner annular face bearing on said member, an outer annular face forming an abutment for a driving tool, and a plurality of fingers projecting inwardly from said body and inclined relatively to the plane of the margin of the body, said fingers being forced into the inner groove, and an outer abutment formed like the inner abutment and including fingers inclined oppositely to those of the inner abutment, and forced into the outer groove to hold the outer abutment against the outer end of the member, the inner abutment, the member, and the outer abutment being successively applied to the shaft.

3. A shaft having a peripheral groove and an abutment formed as an annulus composed of an inexpansible annular body having an inner annular face formed to bear on a member mounted on said shaft, an outer annular face forming an abutment for a driving tool, and a plurality of resilient fingers projecting inwardly from the body and forced into said groove.

4. A shaft having a peripheral groove and an abutment composed of an inexpansible annular body having an inner annular face formed to bear on a member on said shaft, an outer annular face forming an abutment for a driving tool, and a plurality of resilient fingers projecting inwardly from said body and normally inclined relatively to the plane of the margin of the body, and forced into said groove, the inclination of said fingers causing them to act as struts coöperating with one side of the groove in resisting movement of the annulus lengthwise of the shaft.

5. A shaft having a peripheral groove and an abutment composed of an inexpansible annular body having an inner annular face formed to bear on a member on said shaft, an outer annular face forming an abutment for a driving tool, and a plurality of resilient fingers projecting inwardly from the body and formed to be laterally deflected by the periphery of the shaft and thereby put under tension causing them to spring into said groove when brought into registry therewith, the said abutment being engaged with the shaft by moving the abutment on the shaft toward the groove until the fingers spring into the groove.

6. In combination, a shaft having an inner and an outer peripheral groove, a member mounted on said shaft between said grooves, an inner abutment composed of an inexpansible annular body having an inner annular face bearing on said member, an outer annular face forming an abutment for a driving tool, and a plurality of resilient fingers projecting inwardly from said body and inclined relatively to the plane of the margin of the body, said fingers being forced into the inner groove to constitute struts preventing movement of the inner abutment, and an outer abutment formed like the inner abutment and including a plurality of inwardly projecting resilient fingers inclined oppositely from the fingers of the inner abutment, and forced into the outer groove to constitute struts preventing movement of the outer abutment, and confining said abutment against the said member, the inner abutment, the member, and the outer abutment being applied successively.

In testimony whereof I have affixed my signature.

JAMES B. EWART.